(12) United States Patent
Yamashita et al.

(10) Patent No.: US 7,750,069 B2
(45) Date of Patent: Jul. 6, 2010

(54) FLAME-RETARDANT RESIN COMPOSITION, PRODUCTION METHOD OF THE SAME AND MOLDING METHOD OF THE SAME

(75) Inventors: Takehiko Yamashita, Hyogo (JP); Kunihiko Takeda, Aichi (JP); Yoshiyuki Tani, Osaka (JP); Takao Hisazumi, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 10/572,857

(22) PCT Filed: Sep. 17, 2004

(86) PCT No.: PCT/JP2004/013665

§ 371 (c)(1),
(2), (4) Date: Nov. 21, 2006

(87) PCT Pub. No.: WO2005/028558

PCT Pub. Date: Mar. 31, 2005

(65) Prior Publication Data

US 2007/0112107 A1    May 17, 2007

(30) Foreign Application Priority Data

Sep. 22, 2003 (JP) .............................. 2003-329631
Feb. 16, 2004 (JP) .............................. 2004-038212

(51) Int. Cl.
C08K 5/49 (2006.01)
(52) U.S. Cl. ................ 524/115; 524/77; 524/508; 524/357; 524/261
(58) Field of Classification Search ............. 524/284, 524/115, 357, 354, 77, 261
See application file for complete search history.

(56) References Cited

U.S. PATENT DOCUMENTS

| | | | |
|---|---|---|---|
| 3,956,139 A | | 5/1976 | Whelan, Jr. |
| 3,983,185 A | * | 9/1976 | Dorfman et al. ............ 523/508 |
| 4,939,194 A | | 7/1990 | Scott et al. |
| 5,637,135 A | * | 6/1997 | Ottenstein et al. ............ 96/101 |
| 6,337,363 B1 | * | 1/2002 | Lee et al. .................. 523/466 |
| 6,987,139 B2 | | 1/2006 | Terada et al. |
| 2003/0216496 A1 | * | 11/2003 | Mohanty et al. ............ 524/284 |
| 2004/0242803 A1 | * | 12/2004 | Ohme et al. ................ 525/400 |

FOREIGN PATENT DOCUMENTS

| | | |
|---|---|---|
| DE | 43 25 849 A1 | 2/1995 |
| EP | 1 213 111 A2 | 6/2002 |
| EP | 1 304 352 A2 | 4/2003 |
| GB | 2 187 193 A | 9/1987 |
| GB | 2187193 | 9/1987 |
| JP | 53-127484 A | 11/1978 |
| JP | 9-40762 A | 2/1997 |
| JP | 2000-86965 | 3/2000 |
| JP | 2000-86965 A | 3/2000 |
| JP | 2001-164463 A | 6/2001 |
| JP | 2001-172489 | 6/2001 |
| JP | 2001-172489 A | 6/2001 |
| JP | 2002-173583 A | 6/2002 |
| JP | 2002-241566 | * 8/2002 |
| JP | 2004-131671 | 4/2004 |
| JP | 2004-131671 A | 4/2004 |
| JP | 2004-263180 | 9/2004 |
| JP | 2004-263180 A | 9/2004 |
| JP | 2004-277706 | 10/2004 |
| JP | 2004-277706 A | 10/2004 |

OTHER PUBLICATIONS

Gilman et al (Fire retardant additives for polymeric materials 1. Char formation from silica gel -potassium carbonate. Thirteenth meeting of the UJNR panel on fire research and safety, Mar. 13-20, 1996, vol. 2, NIST, 1997.*

Shin Serizawa, et al., "Development of Kenaf Fiber Reinforced Poly(Lactic Acid) (PLA)," The 14th annual meeting of Japan Society of Polymer Processing pre-print materials, 2003, pp. 161-162.

Kunihiko Takeda, "Science of new nano-scale material," How to create nanomaterial, Nov. 30, 2003, Toyo Seiki Seisaku-sho, Ltd., pp. 17-21.

Narihrio Matsuda, et al., "Fine Dispersion of Shape-Controlled and Modified Silica Particles in Molten Plastic," The 49th annual meeting of the Society of Polymer Science, Japan Polymer preprints, 2000, p. 534 II Pc086, vol. 49, No. 3.

(Continued)

*Primary Examiner*—James Seidleck
*Assistant Examiner*—Gregory Listvoyb
(74) *Attorney, Agent, or Firm*—McDermott Will & Emery LLP

(57) ABSTRACT

At least one resin component which is selected from a biodegradable resin and a plant-based resin, and a flame retardancy-imparting component are kneaded to obtain a resin composition having flame retardancy. This resin composition makes it possible to apply the environment-friendly resin such as the biodegradable resin and the plant-based resin, for example, polylactic acid and polybutylene succinate to exterior bodies of home appliances. Particularly, in the case where polylactic acid is used with the acetylacetonatoiron as the flame-retardant component, a resin composition having excellent flame retardancy can be provided as a non-halogen material.

8 Claims, 1 Drawing Sheet

OTHER PUBLICATIONS

Hiroaki Shirasaka, et al., "Flame resistance evaluation at particle fine dispersion polymer," The 50$^{th}$ annual meeting of the Society of Polymer Science, Japan Polymer preprints, 2001, p. 864 III Pc109, vol. 50, No. 4.

Takuya Nakamura, et al., "Combustion Phenomena of Polymer-Inorganic Porous Material Composites," The 39$^{th}$ Symposium on Combustion, Nov. 21-Nov. 23, 2000, pp. 507-508.

Narihiro Matsuda, et al., "Flame retardant of inorganic-organic hybrid materials in nano scale," the 10$^{th}$ Polymer Material Forum, Nov. 2001, pp. 153-154.

Kunihiko Takeda, "1999 Report of flame retardant project joint research," the 7$^{th}$ Symposium New Developments in Flame Retardancy and Environment, Aug. 8, 2000, pp. 49-67.

Data Book of Non-Bromine Flame Retardant Materials, New Energy and Industrial Technology Development Organization, Mar. 25, 2003, pp. 1-5, 68-69, 78-81, 88-89, 92-93, 102-103 and 137.

Narihiro Matsuda, et al., "Synthesis Process of nanocomposite by inorganic porous material dispersion with adjusted strength.," The 35$^{th}$ Autumn Annual Meeting of Society of Chemical Engineers, Sep. 2002, p. 674.

* cited by examiner

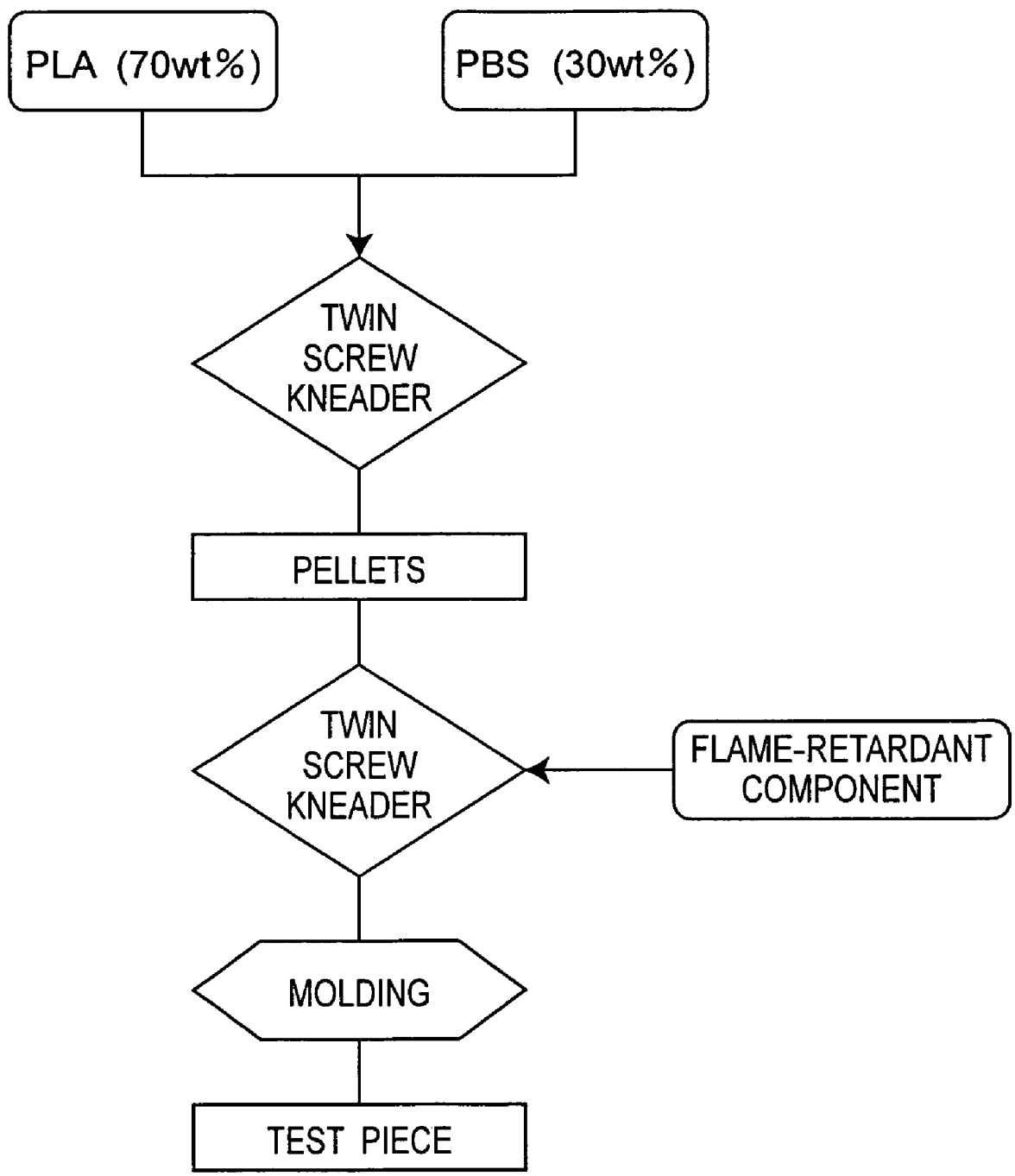

FLAME-RETARDANT RESIN COMPOSITION, PRODUCTION METHOD OF THE SAME AND MOLDING METHOD OF THE SAME

This application is the U.S. National Phase under 35 U.S.C. §371 of International Application No. PCT/JP2004/013665, filed Sep. 17, 2004, which in turn claims the benefit of Japanese Application No. 2003-329631, filed Sep. 22, 2003 and Japanese Application No. 2004-038212, filed Feb. 16, 2004, the disclosures of which Applications are incorporated by reference herein in their entirety.

TECHNICAL FIELD

The present invention is related to a resin composition in which flame retardancy is conferred to a biodegradable resin and/or a resin whose material is plant resource, and a method for producing the resin composition, and a method for molding the resin composition.

Recently, attention is paid to a resin (or plastic) which is degraded by a bacterial action when it is buried in the ground. The resin which is referred to as a biodegradable resin (or a biodegradable plastic) has a characteristic of being degraded under the presence of aerobic bacterial into water ($H_2O$) and carbon dioxide ($CO_2$). The biodegradable resin has been put to practical use in an agricultural field, and has been practically applied as a packaging material of a disposable article and a compostable garbage bag.

When the biodegradable resin is subjected to waste disposal by utilizing its characteristic of being degraded with the bacteria in the ground, it is possible to significantly reduce emission of $CO_2$ compared with conventional incineration. Therefore, attention is paid to the use of the biodegradable resin from the view point of prevention of global warming. The article wherein the biodegradable resin is used may be advantageous to the user because it is unnecessary to collect a used plastic when the article is used in the agricultural field. For these reasons, the market of the biodegradable resin is expanding.

Further, attention has been recently paid to also a plant-based (or plant-derived) resin in the fields of electronics and automobile. The plant-based resin is obtained by polymerizing or copolymerizing monomers which are obtained from plant materials. The plant-based resin draws attention as an environment-friendly resin because it is produced without relying on petroleum resources, the plant which is a material for the resin grows absorbing carbon dioxide, and a burned calorie and a $CO_2$ emission are small when it is disposed of with an incinerator. The plant-based resin generally has biodegradability. The plant-based resin, however, does not necessarily need to have biodegradability only from the viewpoint of prevention of depletion of petroleum resources. In other words, resins which contribute to environmental protection include the plant-based resins which do not have biodegradability, in addition to the biodegradable resins. For this reason, in the specification including the following description, a term "environmental resin" is used for the sake of convenience in order to give a generic name to the biodegradable resins (including petrochemical-based ones and the plant-based ones) and the plant-based resins which do not have the biodegradability.

The environmental resins which are now used are classified roughly into three types, a polylactic acid-based resin (hereinafter, it is abbreviated as a "PLA"), a PBS-based resin (polybutylene succinate (a copolymer resin of 1,4-butanediol and succinic acid)), and a PET-based resin (polyethylene terephthalate). The characteristics of each resin are shown in Table 1.

TABLE 1

|  | PLA (Polylactic acid) | PBS (Polybutylene succinate) | PET (Polyethylene terephthalate) |
|---|---|---|---|
| Biodegradability | ◎ | ◎ | ○ |
| Material | Plant | Petrochemical feedstock A synthesis method with a plant material is reported. | Petrochemical feedstock |

PLA of these resins corresponds to the plant-based resin. PLA can be produced by a chemical synthesis by using sugar as a material, which sugar is made from plant such as corn or sweet potato, and there is a possibility of industrial production of PLA. Such a plastic containing the plant-based resin is also referred to as a bio plastic. Particularly the PLA draws attention since mass production thereof has been started using corn as a material. It is desired that a technique of applying the PLA not only to a use which requires biodegradability, but also to a wide variety of uses is developed.

It is, however, necessary to improve the characteristics of these environmental resins for substituting them for existing materials. The physical properties of polystyrene (PS) and an acrylonitrile-butadiene-styrene resin (hereinafter, it is abbreviated as "ABS") which are general resins and the physical properties of PLA and PBS which are the environmental resins are shown in Table 2. A "bending modulus" and a "bending strength" represent rigidity. As these values are higher, the rigidity is higher. An "izod impact strength" represents a fracture energy when a test piece is subjected to an impact load to be broken. As the value of the "izod impact strength" is larger, the piece is more difficult to be broken when impact is applied. The "heat deformation temperature" is a temperature at which the resin starts to deform. As the value of the "heat deformation temperature" is higher, it is possible to use the resin under a higher-temperature condition.

TABLE 2

|  | General resin | | Environmental resin | |
|---|---|---|---|---|
|  | PS | ABS | PLA | PBS |
| Bending modulus (MPa) | 2250 | 2100 | 4500 | 1950 |
| Bending strength (MPa) | 47 | 70 | 132 | 55 |
| Izod impact strength(J/m) | 80 | 200 | 46 | ND |
| Heat deformation temperature(° C.) | 80 | 96–100 | 66 | 97 |

From this table, it is found that PLA is hard and fragile, and that the PBS is soft. Further, it is found that PLA is poor in heat resistance and that PBS has higher heat resistance than ABS, as a result of comparison of the thermal characteristic.

A method which involves blending another component has been proposed for improving the characteristics of these environmental resins. For example, it is proposed that a synthesized mica of about 0.5-20 wt % is blended with the PLA for the purpose of improving the heat resistance of PLA in Japanese Patent Kokai (Laid-Open) Publication No. 2002-173583 (A) (Patent Literature). In the Japanese Patent Kokai (Laid-Open) Publication No. 2002-173583(A), it is proposed that an additive inhibiting hydrolysis of the biodegradable resin (that is, the biodegrading action), for example, a carbodiimide compound is blended.

Further, it is reported that there is a possibility of applying PLA to an exterior body of a personal computer when kenaf is blended with PLA (see Serizawa et al. "Development of polylactic acid reinforced by kenaf", The 14th annual meeting of Japan Society of Polymer Processing pre-print materials, pp 161-162, 2003 (Non-patent Literature 1). Specifically, it is reported that the heat resistance of the PLA resin is improved by adding an annealing process after molding the PLA resin wherein kenaf is blended, so that there is a higher possibility of applying the PLA to the exterior body of the personal computer.

Patent Literature 1: Japanese Patent Kokai (Laid-Open) Publication No. 2002-173583(A)

Non-patent Literature 1: Serizawa et al. "Development of polylactic acid reinforced by kenaf", The 14th annual meeting of Japan Society of Polymer Processing pre-print materials, pp 161-162, 2003

DISCLOSURE OF INVENTION

Problems to be Solved By Invention

The resin compositions mentioned in the above documents, however, are suggested for improving the heat resistance and these documents do not mention the flame retardancy which is essential for applying the resin composition to the exterior bodies of electric home appliances. In actual, the resin compositions mentioned in the above documents do not have flame retardancy. Therefore, the PLA compositions which have been proposed cannot be applied to the exterior body of the electric appliance such as a television set which has a high-voltage part in the interior thereof. Further, safety is recently weighed on the electric appliance and the flame-retardant resin tends to be employed even in equipment which does not have a high-voltage element. Therefore, the utility of the environmental resin is very low as long as it acquires flame retardancy, even if it has sufficient properties as to the rigidity, the impact strength and the heat resistance.

The present invention is made in the light of these situations. The object of the present invention is to provide an environmental resin composition which is useful for an exterior body of, for example, an electric appliance, by conferring flame retardancy to an environmental resin.

Means to Solve Problems

The inventors studied to solve the problems and found the flame retardancy of the environmental resin is can be improved by adding and mixing a flame retardant into the resin, similarly to a normal resin. In other words, the present invention provides a resin composition which contains at least one resin component which is selected from a biodegradable resin and a plant-based resin and a flame retardancy-imparting component.

Here, the "biodegradable resin" means a resin which can be degraded into low-molecular-weight molecules with microorganism participation in nature after being used and finally degraded into water and oxygen. The "plant-based resin" means a resin which is obtained by polymerizing a monomer which is obtained from plant materials, or a resin which is obtained by copolymerization of the monomer and another monomer (which may not be obtained from the plant materials). The plant-based resin may have the biodegradability or may not have the biodegradability. The plant-based resin which has the biodegradability may be classified as the "biodegradable resin" referred to herein. It should be noted that these two kinds of resins are referred to in parallel in order to clarify that the biodegradable resin or the plant-based resin is used as the polymer component from the view point of the protection of global environment. Further, in this specification, term "resin" is used for referring to a polymer in the resin composition, and the "resin composition" refers to a composition containing at least the resin. A "plastic" refers to a substance which contains the polymer as an essential component. The resin composition of the present invention can be called as plastic since it contains the resin component and the flame retardancy-imparting component.

"Flame retardancy" means property of not continuing combustion or not generating afterglow after removing an ignition source. The "flame retardancy-imparting component" is specifically a flame retardant. The flame retardant used in the present invention is one or more flame retardants selected from, for example, a halogen-based flame retardant, a phosphorus-based flame retardant, an inorganic flame retardant, a silicone-based flame retardant, and a metal complex. The metal complex is preferably used as the flame retardant for the environmental resin, particularly the plant-based resin. Particularly, acetylacetonatoiron, acetylacetonatocobalt and acetylacetonatocopper are preferably used since these confer very favorable flame retardancy to the plant-based resin.

The present invention is preferably applied to a case where polylactic acid (PLA), a lactic acid copolymer, or polybutylene succinate (PBS), or a mixture thereof is contained as the resin component and particularly preferably to a case where polylactic acid is contained as the resin component. As described above, it is suggested that polylactic acid (PLA), as the mass-producible plant-based resin, is used for exterior bodies of home appliances. Therefore, the utility of the resin is further improved by conferring flame retardancy thereto.

The present invention also provides a method for producing a flame-retardant resin composition which method includes kneading a flame retardancy-imparting component and at least one resin selected a biodegradable resin and a plant-based resin. The kneading step is an essential process when producing or molding plastics and carried out while melting the resin component. Therefore, mixing the flame retardancy-imparting component in the kneading step does not give rise to another step for adding the flame retardancy-imparting component and therefore the flame retardant environmental resin may be obtained without raising the production cost so much.

Further, the present invention provides a method for molding a flame-retardant resin composition which method includes molding a composition which is obtained by kneading a flame retardancy-imparting component and at least one resin selected from a biodegradable resin and a plant-based resin according to an injection molding method or a compression molding method. That is, the flame-retardant resin composition of the present invention may be molded according to a conventional method without substantially changing a conventional production apparatus for a plastic molded article. Therefore, the flame-retardant resin composition of the present invention facilitates to replace a conventional thermoplastic as a raw stock with the biodegradable plastic or the plant-based plastic.

Effect of Invention

The present invention makes it possible to confer the flame retardancy to the biodegradable resin and the plant-based resin which are environment-friendly, without increasing a production step. As a result, since plastics containing these resins can be used as the exterior body of an electric appliance, the flame-retardant resin composition of the present invention has a large industrial value to be useful.

BRIEF DESCRIPTION OF DRAWINGS

FIG. 1 is a flow chart showing a method for producing a flame-retardant resin composition of the present invention.

BEST MODE FOR CARRYING OUT THE INVENTION

As described above, a flame-retardant resin composition of the present invention includes, as a resin component, one or more resins selected from a biodegradable resin and a plant-based resin, and further includes a flame retardancy-imparting component. Firstly, the resin component is described.

Any of known biodegradable resins and known plant-based resins may be used. As the biodegradable resin, polycaprolactone (PCL), polybutylene succinate (PBS), and polyethylene terephthalate (PET) which are produced from a petrochemical material and polyhydroxybutyric acid (PHB) which is produced by a microorganism, are exemplified. PCL, PBS and PET may be obtained by polymerizing a plant-derived monomer which is produced from a plant material. Representative plant-based resins are polylactic acid (PLA) and a lactic acid copolymer. PLA and the lactic acid copolymer are resins which are produced by polymerizing lactic acid that are obtained by fermenting starch or sugar which is obtained from, for example, a cone or a sweet potato. PLA is a biodegradable resin of a hydrolyzable type. In the usage which does not prefer the hydrolyzability, a compound which reduces the hydrolyzability of the resin may be added. In that case, the resin has low biodegradability or does not have biodegradability. As described, however, the plant-based resin is preferably used in the present invention irrespective of degradability from the view point of environment protection, since it is obtained not using the petroleum resources, a burned calorie is low, and the plant which is a material for the resin grows absorbing carbon dioxide.

PBS or PLA is preferably used as the resin component in the present invention. PLA or a mixture of PLA and another resin is particularly preferably used. A molded article formed from PLA may be used in various applications since PLA has excellent transparency and rigidity. On the other hand, PLA has drawbacks of low heat resistance and low impact resistance, and somewhat low injection moldability. For this reason, it is preferable to mix another resin and/or a modifier into PLA, particularly when PLA is injection molded. For example, PBS is suitable for being mixed with PLA since PBS has excellent heat resistance and PBS itself has biodegradability. Specifically, PLA and PBS are mixed at a ratio of 95:5 to 55:45 (weight ratio). Alternatively, PLA may be modified using a commercially-available modifier for polylactic acid.

The resin component may contain a resin other than the biodegradable resin and the plant-based resin (for example, a resin not having biodegradability, whose material is petrochemical feedstock), if necessary. In that case, the another resin is preferably contained in an amount of at most 45 wt % of the entire resin component. It is not preferable that the resin which does not have the biodegradability and is not the plant-based resin is contained in a large amount from a viewpoint of environmental protection. Further, in that case, the flame retardancy of the composition may be reduced when the flame retardancy is imparted by a metal complex such as below-mentioned acetylacetonatocopper.

Next, the flame retardancy-imparting component is described. The flame retardancy-imparting components (which is referred to as a "flame-retardant component") include a superacid salt, a dehydrogenation catalyst, and a metal complex, in addition to a halogen-based flame retardant, a phosphorus-based flame retardant, an inorganic flame retardant and a silicone-based flame retardant which are known as a flame retardant.

The halogen-based flame retardants include a bromine-based flame retardant, such as tetrabromobisphenol-A (TBBA), decabromodiphenyl oxide (DBDPO), hexabromocyclododecane (HBCD), octabromodiphenyl oxide (OBDPO), bistribromophenoxyethane (BTBPE), tribromophenol (TBP), ethylene-bis-(tetrabromo-phthalimide), TBA polycarbonate oligomer, bromopolystyrene, TBA epoxy oligomer, TBA epoxy polymer, TBA bisbromopropyl ehter, ethylenebispentabromodiphenyl, polybromophenyl oxide, and hexabromobenzene, and a chlorine-based flame retardant such as a chlorinated paraffin, perchlorocyclopentadecane, and chlorendic acid.

Specifically, the phosphorus-based flame retardants include TPP, triallylphosphate, an aromatic phosphate ester, 2-ethylhexyl diphenyl phosphate, triethyl phosphate, TCP, cresyl phenyl phosphate, tris(chloroethyl)phosphate, tris-β-chloropropyl phosphate, tris-dichloropropyl phosphate, a halogen-containing condensed phosphoric acid ester, an aromatic condensed phosphoric acid ester, polyphosphoric acid salt, and red phosphorus.

The inorganic flame retardants include, for example, $Mg(OH)_2$, $Al(OH)_3$, $Sb_2O_3$, guanidine acid, $Sb_2O_5$, zinc borate, a molybdenum compound, and zinc stannate.

The flame-retardant components other than the above-mentioned ones are exemplified below. In the case where the superacid salt is used as the flame-retardant component, potassium fluorobutanesulfonate, potassium fluoromethanesulfonate, sodium fluoromethanesulfonate, sulfonic acid supported on iron oxide, or tungstic acid supported on iron oxide may be used. Further, the flame-retardant components of the dehydrogenation catalysts include chromium oxide, copper chrome, copper oxide, iron oxide, lanthanum oxide, manganese oxide, molybdenum oxide, nickel oxide, a copper-chrome catalyst, palladium oxide, tin pyrophosphate, tantalum oxide, titanium oxide, titanium pyrophosphate, tungsten oxide, zinc pyrophosphate, zirconium pyrophosphate, vanadium oxide, and zinc oxide. In the case where the metal complex is used as the flame-retardant component, acetylacetonatoiron, acetylacetonatocobalt, acetylacetonatocopper, iron dimethylthiocarbamate, ferric benzoylacetonate, tris(dibenzoylmethanato)iron, or copper ethylenediaminetetraacetate may be used. As a clay-based flame-retardant component, for example, smectite or montmorillonite may be used. Intumescent flame-retardant components include, for example, a combination of ammonium polyphosphate acid (APP) and penerythritol (PER). In the case where a resin is used as the flame-retardant component, polyphenylene ether (PPE) or polycarbonate (PC) may be used. Other flame-retardant components include, for example, a silicone-based flame retardant such as dimethyl silicone and methyl phenyl silicone, brominated aromatic triazine, and a composite flame retardant. It should be noted that a compound other than the compounds exemplified above may be used as long as the compound confers a desired flame retardancy to the resin composition. Further, two or more flame retardants may be used in combination in the resin composition of the present invention. In that case, a proportion of each flame retardant may be selected appropriately depending on the desired flame retardancy.

Zinc oxide and vanadium oxide, and the metal complex such as acetylacetonatoiron, copper ethylenediaminetetraacetate, acetylacetonatocopper and ferric benzoylacetonate of the above-mentioned flame-retardant components may exert high flame retardancy effect, when they are added in a small amount to the biodegradable resin and the plant-based resin, particularly the plant-based resin. Therefore, since the application of these flame-retardant components enable the added amount of these components to be small, a change in physical property of the resin composition due to the addition of the flame-retardant component (for example, reduction in a bending strength and modulus of elasticity) can be small. Further, when the added amount of the flame-retardant component is small, the resin composition is facilitated to be recycled to be used. Acetylacetonatoiron ($Fe(acac)_3$) is preferably used since it confers higher flame retardancy particularly to the plant-based resin (specifically, polylactic acid) compared with the known halogen-based flame retardant and the known phosphorus-based flame retardant.

The mixing ratio of the flame-retardant component is determined depending on the type of the flame-retardant component, the type of the resin component, the degree of the flame retardancy required for the resin composition and the change in physical property of the resin composition due to the addition of the flame-retardant component. Specifically, the flame-retardant component preferably occupies from 5 wt % to 40 wt % of the resin composition. When the proportion of the flame-retardant component is below 5 wt %, significant flame retardancy-improving effect is difficult to be achieved. When the proportion of the flame-retardant component is over 40wt %, undesirable effect due to mixing of the flame-retardant component (for example, inferior moldability due to reduction in flowability) becomes noticeable.

The above-mentioned mixing ratio of the flame-retardant component is an example, and an optimal mixing ratio of the flame-retardant component differs depending on the type of the resin component and the type of the flame-retardant component. For example, assuming that polylactic acid, the lactic acid copolymer or a mixture of at least one resin selected from these resins and another resin(s) is the polymer resin, when the metal complex (particularly acetylacetonatoiron) is used as the flame-retardant component, the metal complex is preferably mixed so that it occupies 1 wt % to 15 wt % of the resin composition. When the halogen-based flame retardant is used as the flame-retardant component, the flame-retardant component is preferably mixed so that it occupies 10 wt % to 30 wt % of the resin composition. When the phosphorus-based flame-retardant component is used as the flame-retardant component, the flame-retardant component is preferably mixed so that is occupies 20 wt % to 40 wt % of the resin composition.

The flame-retardant component is preferably dispersed in the resin with the component supported on an inorganic porous material. Specifically, the flame-retardant component is preferably dispersed in the resin by a method wherein the flame-retardant component is supported on the inorganic porous material followed by being kneaded with the resin component so that the inorganic porous material is crushed into fine particles and dispersed in the resin. The combination with the inorganic porous material gives the resin composition wherein the flame-retardant component is more evenly dispersed, whereby the added amount of the flame-retardant component is more reduced. In other words, in the case where the inorganic porous material is employed, granules which are large enough not to aggregate are added at the beginning of kneading and then they are crushed into fine particles during the kneading to be dispersed evenly, which results in improvement in dispersibility of the flame-retardant component compared with the case of adding the flame-retardant component alone. Further, the inorganic porous material improves the flame retardancy of the resin composition synergistically with the supported flame-retardant component, since the material itself has a characteristic of conferring flame retardancy to the resin.

The inorganic porous material is a porous material formed from silicon oxide and/or aluminum oxide, which has pores of which diameter is from 10 nm to 50 nm at a ratio of 45 vol % to 55 vol %. Such an inorganic porous material is preferably a granular material which has a diameter of from 100 nm to 1000 nm when the flame-retardant component is supported. When the granular diameter is too small, aggregation may occur to give giant particles. On the other hand, when the granular diameter is too large, the granular diameter of the inorganic porous material after being crushed in the kneading step may be large not to be dispersed evenly. The inorganic porous material preferably has a granular diameter of from 25 nm to 150 nm in the final resin composition (that is, after kneading the inorganic porous material). In the case where the inorganic porous material is used, the flame-retardant component may be supported at a ratio of 3 parts to 50 parts by weight to the inorganic porous material of 100 parts by weight. The inorganic porous material which supports the flame-retardant component at such a ratio may be added and kneaded so that it occupies, for example, from 1 wt % to 40 wt % of the entire resin composition. The supported amount of the flame-retardant component and the added amount of the inorganic porous material are illustrative, and they may be outside these ranges depending on the type of the flame-retardant component.

The flame-retardant component may be supported on the inorganic porous material by a method wherein the inorganic porous material is immersed in a liquid in which the flame-retardant component to be supported is dissolved or dispersed (for example, in the case of a metal complex, an aqueous solution thereof), and then a solvent is evaporated by heating. The inorganic porous material itself can be produced by a known method. For example, the material may be obtained by a technique of dissolving a pore-forming agent (for example, a water soluble inorganic salt) in a silica sol and sintering the dried sol followed by dissolving the pore-forming agent into hot water to remove the agent from resultant particles. Alternatively, the inorganic porous material may be a porous glass or a zeolite.

A specific example is described wherein polylactic acid or the lactic acid copolymer is selected as the resin component and acetylacetonatoiron and/or acetylacetonatocopper is selected as the flame-retardant component. In this case, it is preferable to employ, as the inorganic porous material, a porous material formed from silicon oxide (silica) containing pores with a pore diameter of from 10 nm to 50 nm at a ratio of 44 vol % to 55 vol %, in a form of granules having a granular diameter of from 100 nm to 500 nm. Acetylacetonatoiron and/or acetylacetonatocopper are preferably supported on the silica porous material at a ratio of 5 parts to 45 parts by weight to the silica porous material of 100 parts by weight, and more preferably at a ratio of 10 parts to 35 parts by weight. The silica porous material supporting acetylacetonatoiron and/or acetylacetonatocopper is preferably added so as to occupy 5 wt % to 40 wt % of the entire resin composition, and more preferably 5 wt % to 15 wt %. The inorganic porous material is dispersed as fine particles having a particle diameter of from 25 nm to 150 nm in the resin, and acetylacetonatoiron and/or acetylacetonatocopper is mixed at a ratio of 0.5 wt % to 5.25 wt % in the resin composition which is obtained by adding this inorganic porous material followed by followed by kneading. The use of the inorganic porous material makes it possible to reduce the added ratio of the flame-retardant component.

The resin composition of the present invention may contain an auxiliary agent for flame retardant in addition to the flame-retardant component. The auxiliary agent for flame retardant cannot serve as the flame-retardant component by itself, but enhances the flame retardancy-improving effect exerted by the flame-retardant component, when the agent is added together with the flame-retardant component. Therefore, the use of the auxiliary agent for flame retardant enables the added amount of the flame-retardant component to be further reduced. As the auxiliary agent for flame retardant, for example, one or more compounds may be used, which compound(s) is selected from an organic peroxide, such as a ketone peroxide, a peroxy ketal, a hydroperoxide, and a dialkyl peroxide, a peroxy ester and a peroxydicarbonate; a dimethyl-diphenyl butane; and a derivative of these compounds. When the organic peroxide is used as the auxiliary agent for flame retardant, it is presumed that the organic peroxide releases oxygen in the resin composition whereby the flame retardancy of the resin composition is improved. When the dimethyl-diphenyl butane is used as the auxiliary agent for flame retardant, it is presumed that the dimethyl-diphenyl butane exerts a radical trap effect whereby the flame retardancy of the resin composition is improved. These presumptions, however, do not affect the scope of the present invention. When a plurality of compounds are used, the mixing ratio of the compounds is not limited to a particular one, and it is selected so that a desired flame retardant property is achieved. The auxiliary agent for flame retardant may be added in an amount of 5 parts to 45 parts by weight to the flame-retardant component of 100 parts by weight, depending on the type and the added amount of the flame-retardant component. Further, the total amount of the auxiliary agent for flame retardant and the flame-retardant component preferably corresponds to an amount of 5 wt % to 40 wt % of the entire resin composition. The reason therefor is as described in connection with the flame-retardant component.

The resin composition of the present invention may contain another component in addition to the above-described components (that is, the resin component, the flame-retardant component (including the inorganic porous material in the case where the flame-retardant component is supported on the material), and the auxiliary agent for flame retardant which is optionally mixed). For example, a colorant may be contained so that the color of the resin composition is a desired one. Further, for the purpose of achieving the desired physical property of the resin composition, a butadiene rubber, for example, may be included in order to improve impact resistance, if necessary.

The resin composition of the present invention is produced by kneading the resin component and the flame-retardant component. The kneading may be carried out before forming pellets, when the pellet-shaped resin composition is produced. Alternatively, a pellet-shaped resin (or resin composition) may be kneaded with the flame-retardant component, and then formed into a pellet shape again. Alternatively, the flame-retardant component may be mixed with a melted resin that does not contain the flame-retardant component during a molding step. When an exterior body of an electric appliance is produced by molding a plastic, an injection molding method wherein the resin is melted and injection-molded in a metallic mold of a desired shape, or a compression molding method wherein the resin is melted and a pressure is applied with an upper mold and a lower mold is generally employed. In these molding methods, a step of kneading the melted resin with a kneader is carried out. Therefore, the flame-retardant component is mixed with the resin component upon the kneading, to give a molded body formed from the flame-retardant resin composition. Such addition of the flame-retardant component does not require another step of adding the flame-retardant component, and thereby the resin composition of the present invention is efficiently produced.

The resin composition of the present invention is obtained by conferring flame retardancy to an environment-friendly resin, and it is preferably used in a form of molded body, as exterior bodies or parts of various electric appliances. Specifically, the resin composition of the present invention may be used as members for the exterior bodies and the parts of a computer, a cellular phone, audio products (such as a radio, a cassette deck, a CD player, and an MD player), a microphone, a keyboard, and a portable audio player. Alternatively, the resin composition of the present invention may be used for an interior material of a car, an exterior material of a two-wheel vehicle, and various miscellaneous household goods.

EXAMPLES

Example 1

Polylactic acid (PLA) of 70 wt %, which was synthesized from corn as a material and polybutylene succinate (PBS) of 30 wt % were kneaded with a twin screw kneader and pellets were produced. Herein, PBS was added for the purpose of improving heat resistance.

In this example, acetylacetonatoiron (Fe(acac)$_3$) as a flame-retardant component was supported on an $SiO_2$ porous material. Fe(acac)$_3$ was supported at a ratio of 60 parts by weight to the porous material of 100 parts by weight. The pellets of 90 wt % which was obtained in Step 1 and the $SiO_2$ porous material of 10 wt % which supported Fe(acac)$_3$) were kneaded with the twin screw kneader at 185° C. (Step 2) and press-molded into a test piece of 125 mm×13 mm×3.2 mm (at a molding temperature of 180° C. under a pressure of 120 kg/cm$^2$) (Step 3). The $SiO_2$ porous material used in this example had a porosity of about 45 vol % to about 50 vol %, and a granular diameter of about 100 nm to about 1000 nm. This $SiO_2$ porous material was crushed by a shearing force when being kneaded with the resin, and finally dispersed as finer particles which had a particle diameter of about 25 nm to about 150 nm (a mean particle diameter of about 75 nm) in the resin. The content of Fe(acac)$_3$ in the resin composition was calculated to be 3.75 wt %.

This test piece was subjected to a 20 mm vertical flame test according to Underwriters Laboratories-94. The result is shown in Table 3. From the test results, this sample was evaluated to be V0 according to the UL specification.

Example 2

Acetylacetonatoiron (Fe(acac)$_3$) powder which was not supported on the $SiO_2$ porous material was kneaded together with the pellets obtained in Step 1 of Example 1 and a mixing ratio of (Fe(acac)$_3$) was determined which ratio was necessary for obtaining a flame-retardant resin composition which satisfied V0 according to the UL specification.

A blending sequence (order) for the composition in this example is also illustrated by the flow chart shown in FIG. 1 similarly to Example 1. In this example, the pellets obtained in Step 1 and acetylacetonatoiron as the flame-retardant component were kneaded by the twin screw kneader at 185° C. (Step 2), and press-molded into a test piece of 125 mm×13 mm×3.2 mm (at a molding temperature of 180° C. under a pressure of 120 kg/cm$^2$) (Step 3). In this example, a plurality of test pieces were made varying the mixing ratio of Fe(acac)$_3$ to pellet and each piece was evaluated as to flame retardancy. Fe(acac)$_3$ was used in a form of powder which had a particle diameter of about 2 µm to about 80 µm without being supported on the SiO$_2$ porous material. In this case, the powder was not crushed by kneading and the powder remaining the initial size was dispersed in the resin. Therefore, the mixing ratio of the pellet to Fe(acac)$_3$ was required to be 88:12 (weight ratio) in order to achieve the flame retardancy V0 according to the UL specification, similarly to Example 1. The results of the UL-94 vertical flame test for the test piece that contained Fe(acac)$_3$ in an amount of 12 wt % are shown as the results of this example in Table 3.

Example 3

Pellets were produced by kneading polylactic acid (PLA) and polybutylene succinate (PBS) following the same procedures as those in Example 1 (Step 1).

A blending sequence (order) for the composition in this example is also illustrated by the flow chart shown in FIG. 1 similarly to Example 1. In this example, zinc borate as the flame-retardant component was supported on the SiO$_2$ porous material. Zinc borate of 42 parts by weight was supported to the porous material of 100 parts by weight. The pellets of 90 wt % obtained in Step 1 and the zinc borate-supporting SiO$_2$ porous material of 10 wt % were mixed with the twin screw kneader at 185° C. (Step 2), and press-molded into a test piece of 125 mm×13 mm×3.2 mm (at a molding temperature of 180° C. under a pressure of 120 kg/cm$^2$) (Step 3). The SiO$_2$ porous material employed in this example was the same as that employed in Example 1 and dispersed in the resin in a form of fine particles in the order of nanometer by kneading. The content of zinc borate in the resin composition was calculated to be 3.0 wt %.

The resultant test piece was subjected to the UL-94 vertical flame test similarly to Example 1. The results are shown in Table 3. From the results shown in Table 3, this sample was evaluated to be V0 according to the UL specification.

Example 4

Zinc borate powder which was not supported on the SiO$_2$ porous material was kneaded together with the pellets obtained in Step 1 of Example 1 and a mixing ratio of zinc borate was determined which ratio was necessary for obtaining a flame-retardant resin composition which satisfied V0 according to the UL specification.

A blending sequence (order) for the composition in this example is also illustrated by the flow chart shown in FIG. 1 similarly to Example 1. In this example, the pellets obtained in Step 1 and zinc borate as the flame-retardant component were kneaded by the twin screw kneader at 185° C. (Step 2), and press-molded into a test piece of 125 mm×13 mm×3.2 mm (at a molding temperature of 180° C. under a pressure of 120 kg/cm$^2$) (Step 3). In this example, a plurality of test pieces were made varying the mixing ratio of zinc borate to pellet and each piece was evaluated as to flame retardancy. Zinc borate was used in a form of powder which had a particle diameter of about 5 µm to about 100 µm without being supported on the SiO$_2$ porous material. In this case, the powder was not crushed by kneading and the powder remaining the initial size was dispersed in the resin. Therefore, the mixing ratio of the pellet to zinc borate was required to be 86:14 (weight ratio) in order to achieve the flame retardancy V0 according to the UL specification, similarly to Example 3. The results of the UL-94 vertical flame test for the test piece that contained zinc borate in an amount of 14 wt % are shown as the results of this example in Table 3.

Example 5

Pellets were produced by kneading polylactic acid (PLA) and polybutylene succinate (PBS) following the same procedures as those in Example 1 (Step 1). A blending sequence (order) for the composition in this example is also illustrated by the flow chart shown in FIG. 1 similarly to Example 1. In this example, TBBA (tetrabromobisphenol-A) as the flame-retardant component was supported on the SiO$_2$ porous particles. TBBA of 20 parts by weight was supported to the porous particles of 100 parts by weight. The pellets of 90 wt % obtained in Step 1 and the TBBA-supporting SiO$_2$ porous particles of 10 wt % were kneaded with the twin screw kneader at 185° C. (Step 2), and press-molded into a test piece of 125 mm×13 mm×3.2 mm (at a molding temperature of 180° C. under a pressure of 120 kg/cm$^2$) (Step 3). The SiO$_2$ porous particles employed in this example were the same as those employed in Example 1 and dispersed in the resin in a form of fine particles in the order of nanometer by kneading. The content of TBBA in the resin composition was calculated to be 1.7%.

The resultant test piece was subjected to the UL-94 vertical flame test similarly to Example 1. The results are shown in Table 3. From the results shown in Table 3, this sample was evaluated to be V0 according to the UL specification.

Example 6

TBBA powder which was not supported on the SiO$_2$ porous material was kneaded together with the pellets obtained in Step 1 of Example 1 and a mixing ratio of TBBA was determined which ratio was necessary for obtaining a flame-retardant resin composition which satisfied V0 according to the UL specification.

A blending sequence (order) for the composition in this example is also illustrated by the flow chart shown in FIG. 1 similarly to Example 1. In this example, the pellets obtained in Step 1 and TBBA as the flame-retardant component were kneaded by the twin screw kneader at 185° C. (Step 2), and press-molded into a test piece of 125 mm×13 mm×3.2 mm (at a molding temperature of 180° C. under a pressure of 120 kg/cm$^2$) (Step 3). In this example, a plurality of test pieces were made varying the mixing ratio of TBBA to pellet and each piece was evaluated as to flame retardancy. TBBA was used in a form of powder which had a particle diameter of about 20 µm to about 100 µm without being supported on the SiO$_2$ porous material. In this case, the powder was not crushed by kneading and the powder remaining the initial size was dispersed in the resin. Therefore, the mixing ratio of the pellet to TBBA was required to be 85:15 (weight ratio) in order to achieve the flame retardancy V0 according to the UL specification, similarly to Example 5. The results of the UL-94 vertical flame test for the test piece that contained TBBA in an amount of 15 wt % are shown as the results of this example in Table 3.

Example 7

A sample wherein only $SiO_2$ porous particles were mixed with the pellets obtained in Step 1 of Example 1 was produced. A blending sequence (order) for the composition in this example is also illustrated by the flow chart shown in FIG. 1 similarly to Example 1. In this example, the pellets of 70 wt % obtained in Step 1 and the $SiO_2$ porous particles of 30 wt % were kneaded by the twin screw kneader at 185° C. (Step 2), and press-molded into a test piece of 125 mm×13 mm×3.2 mm (at a molding temperature of 180° C. under a pressure of 120 kg/cm$^2$) (Step 3). The $SiO_2$ porous particles employed in this example were the same as those employed in Example 1 and finally dispersed in the resin in a form of fine particles in the order of nanometer by kneading.

The resultant test piece was subjected to the UL-94 vertical flame test similarly to Example 1. The results are shown in Table 3. From the results shown in Table 3, this sample was evaluated to be V2 according to the UL specification.

Example 8

Pellets were produced by kneading polylactic acid (PLA) and polybutylene succinate (PBS) following the same procedures as those in Example 1 (Step 1). A blending sequence (order) for the composition in this example is illustrated by the flow chart shown in FIG. 1 similarly to Example 1. In this example, copper ethylenediaminetetraacetate as the flame-retardant component was supported on the $SiO_2$ porous particles. Copper ethylenediaminetetraacetate of 17.6 parts by weight was supported to the porous particles of 100 parts by weight. The pellets of 90 wt % obtained in Step 1 and the copper ethylenediaminetetraacetate-supporting $SiO_2$ porous particles of 10 wt % were kneaded with the twin screw kneader at 185° C. (Step 2), and press-molded into a test piece of 125 mm×13 mm×3.2 mm (at a molding temperature of 180° C. under a pressure of 120 kg/cm$^2$) (Step 3). The $SiO_2$ porous particles employed in this example were the same as those employed in Example 1 and finally dispersed in the resin in a form of fine particles in the order of nanometer. The content of copper ethylenediaminetetraacetate in the resin composition was calculated to be 1.5 wt %.

The resultant test piece was subjected to the UL-94 vertical flame test similarly to Example 1. The results are shown in Table 3. From the results shown in Table 3, this sample was evaluated to be V0 according to the UL specification.

Example 9

Pellets were produced by kneading polylactic acid (PLA) and polybutylene succinate (PBS) following the same procedures as those in Example 1 (Step 1). A blending sequence (order) for the composition in this example is also illustrated by the flow chart shown in FIG. 1 similarly to Example 1. In this example, acetylacetonatoiron (Fe(acac)$_3$) as the flame-retardant component was supported on the porous particles. Fe(acac)$_3$ of 60 parts by weight was supported to the $SiO_2$ porous particles of 100 parts by weight. The pellets of 90 wt % obtained in Step 1, the Fe(acac)$_3$-supporting $SiO_2$ porous particles of 5 wt % and t-butyl-trimethylsil peroxide ("PERBUTYL SM" manufactured by NOF CORPORATION) of 5 wt % were kneaded with the twin screw kneader at 185° C. (Step 2), and press-molded into a test piece of 125 mm×13 mm×3.2 mm (at a molding temperature of 180° C. under a pressure of 120 kg/cm$^2$) (Step 3). The $SiO_2$ porous particles employed in this example were the same as those employed in Example 1 and finally dispersed in the resin in a form of fine particles in the order of nanometer by kneading. The content of Fe(acac)$_3$ in the resin composition was calculated to be 1.9 wt %.

The resultant test piece was subjected to the UL-94 vertical flame test similarly to Example 1. The results are shown in Table 3. From the results shown in Table 3, this sample was evaluated to be V0 according to the UL specification.

TABLE 3

| Item | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| Afterflame time | 11 sec. | 10 sec. | 11 sec. | 8 sec. | 9 sec. | 10 sec. | 20 sec. | 13 sec. | 12 sec. |
| Total afterflame time for 5 samples | 65 sec. | 60 sec. | 65 sec. | 68 sec. | 62 sec. | 65 sec. | 95 sec. | 67 sec. | 65 sec. |
| Afterflame time after second flame application | 13 sec. | 12 sec. | 11 sec. | 14 sec. | 13 sec. | 15 sec. | 25 sec. | 14 sec. | 15 sec. |
| Afterflame or afterglow up to holding clamp | No | No | No | No | No | No | No | No | No |
| Cotton indicator ignited by flaming particles or drops | No | No | No | No | No | No | No | No | No |
| Rating | V0 | V0 | V0 | V0 | V0 | V0 | V2 | V0 | V0 |

It is found that the $SiO_2$ porous material per se is a flame-retardant component from the results of Example 7. Therefore, it can be said that the flame retardancy of the resin composition is synergistically improved by the $SiO_2$ porous material and the flame-retardant component supported on the material in the samples obtained in Examples 1, 3 and 5. Further, the results of Examples 1 to 4, 8 and 9 show that PLA is flame-retarded with a non-halogenated material. Further, acetylacetonatoiron employed in Examples 1 and 2 ensures the flame retardancy of V0 according to the UL specification at a lower mixing ratio compared with the other flame-retardant components employed in the other examples, which shows that acetylacetonatoiron is suitable for flame-retardation of the PLA. Further, Example 9 shows that when the auxiliary agent for flame retardant is used, the mixing ratio of the flame-retardant component can be further reduced.

Example 10

Stalk portions of kenaf were crushed with a hammer and water was added thereto. The kenaf stalks were cut into fibers of about 100 μm length by agitating with a mixer. Next, a mixture of kenaf and water was spread on a vat and placed in a drying oven (60° C.) and dried for 48 hours. After drying, the kenaf is scraped off from the vat to give kenaf fibers to be mixed with polylactic acid. Pellets of polylactic acid (PLA) and kenaf fibers were kneaded at a ratio of 70:30 (weight ratio) with a twin screw kneader so as to produce pellets. Next, these pellets of 70 wt % and Mg(OH)$_2$ of 30 wt % were blended according to the same procedures as those in Example 1, whereby a test piece of a flame-retardant resin composition was produced. This piece was subjected to the UL-94 vertical test according to the same procedures as those in Example 1.

As a result, this had flame retardancy meeting the V0 rating.

Example 11

Polylactic acid (PLA) of 50 wt % and polybutylene succinate of 22.5 wt % and TBBA of 12.5 wt % and Mg(OH)$_2$ of 15 wt % were charged into the twin screw kneader and kneaded at 500 rpm and 195° C. so as to produce pellets. The resultant pellets were charged into an injection molding machine to carry out injection molding with a metallic mold for a back cover for a television receiver. Herein, the molding temperature was 180° C., and a temperature of the metallic mold was 80° C. so that the elution of the flame-retardant component due to quenching was avoided. After molding, the metallic mold was cooled and the molded product was taken out at a room temperature whereby the back cover for television receiver was obtained.

The physical property of the resultant back cover was compared with that of a back cover for a television receiver which was formed form a conventional resin composition that was obtained by mixing polystyrene (PS) with a flame retardant, and a significant difference was not observed.

INDUSTRIAL APPLICABILITY

The resin composition of the present invention is one wherein flame retardancy is conferred to a biodegradable resin and/or a plant-based resin which reduces the environmental load associated with procurement of materials and disposal after being used, and the composition is characterized in that the industrial practicability thereof is high. Therefore, this resin composition is suitable for constituting various articles and useful as a material constituting, particularly exterior bodies of electric appliances and so on.

The invention claimed is:

1. A resin composition comprising at least one resin component, and a flame retardancy-imparting component, wherein said at least one resin component is selected from the group consisting of:
    a thermoplastic biodegradable resin,
    a thermoplastic polymer obtained by polymerizing a monomer which is obtained from plant material and
    a thermoplastic copolymer consisting of a plant derived monomer and a non-plant derived monomer,
    wherein said flame retardancy-imparting component is dispersed in the resin composition,
    wherein said flame retardancy-imparting component is supported on an inorganic porous material before it is dispersed in said resin composition,
    wherein said inorganic porous material on which flame retardancy-imparting component is supported is solid and particulate before it is dispersed in said resin composition, and
    said inorganic porous material on which said flame retardancy-imparting component is supported has a diameter of from 25 nm to 150 nm in the resin composition.

2. The resin composition according to claim 1, wherein said at least one resin component is selected from the group consisting of:
    polylactic acid, a lactic acid copolymer and polybutylene succinate.

3. The resin composition according to claim 1, wherein said flame retardancy-imparting component is at least one selected from the group consisting of:
    a halogen-containing flame retardancy-imparting component, a phosphorous-containing flame retardancy-imparting component, an inorganic flame retardancy-imparting component and a silicone-containing flame retardancy-imparting component.

4. The resin composition according to claim 1, wherein the flame retardancy-imparting component is acetylacetonatoiron.

5. The resin composition according to claim 1, wherein the flame retardancy-imparting component is acetylacetonatocopper.

6. A molded body formed from a resin composition comprising at least one resin component, and a flame retardancy-imparting component, wherein said at least one resin component is selected from the group consisting of:
    a thermoplastic biodegradable resin,
    a thermoplastic polymer obtained by polymerizing a monomer which is obtained from plant material and
    a thermoplastic copolymer consisting of a plant derived monomer and a non-plant derived monomer,
    wherein said, flame retardancy-imparting component is dispersed in the resin composition,
    wherein said flame retardancy-imparting component is supported on an inorganic porous material before it is dispersed in said resin composition,
    wherein said inorganic porous material on which flame retardancy-imparting component is supported is solid and particulate before it is dispersed in said resin composition, and
    said inorganic porous material on which said flame retardancy-imparting component is supported has a diameter of from 25 nm to 150 nm in the resin composition.

7. A method for producing a resin composition which comprises kneading at least one resin component, and a flame retardancy-imparting component, wherein said at least one resin component is selected from the group consisting of:
    a thermoplastic biodegradable resin,
    a thermoplastic polymer obtained by polymerizing a monomer which is obtained from plant material, and
    a thermoplastic copolymer consisting of a plant derived monomer and a non-plant derived monomer wherein the flame retardancy-imparting component is dispersed in the resin composition,
    wherein the flame retardancy-imparting component is supported on an inorganic porous material before it is dispersed in said resin composition,
    wherein said inorganic porous material on which flame retardancy-imparting component is supported is solid and particulate before it is dispersed in said resin composition, and
    said inorganic porous material on which said flame retardancy-imparting component is supported has a diameter of from 25 nm to 150 nm in the resin composition.

8. A method for molding a resin composition wherein said resin composition is produced by a method comprising kneading at least one resin component and a flame retardancy-imparting component,
   wherein said resin composition is molded by an injection molding method or a compression molding method,
   wherein said at least one resin component is selected from the group consisting of:
   a thermoplastic biodegradable resin,
   a thermoplastic polymer obtained by polymerizing a monomer, which is obtained from plant material, and
   a thermoplastic copolymer consisting of a plant derived monomer and a non-plant derived monomer,
   wherein said flame retardancy-imparting component is supported on an inorganic porous material before it is dispersed in said resin composition,
   wherein said inorganic porous material on which flame retardancy-imparting component is supported is solid and particulate before it is dispersed in said resin composition, and
   said inorganic porous material on which said flame retardancy-imparting component is supported has a diameter of from 25 nm to 150 nm in the resin composition.

* * * * *